United States Patent

Takahashi et al.

[11] Patent Number: 6,013,207
[45] Date of Patent: Jan. 11, 2000

[54] METHOD FOR MAKING SHAPED CARBIDES OF COHESIVELY INTERTANGLED SINGLE FIBERS

[76] Inventors: Minoru Takahashi, Kunitachi-Higashi-Ichibankan 305, 8-2, Higashi 1-chome, Kunitachi-shi, Tokyo; Ryoji Harada, 755-4, Nonoshita 3-chome, Nagareyama-shi, Chiba-ken, both of Japan

[21] Appl. No.: 08/967,237

[22] Filed: Nov. 5, 1997

Related U.S. Application Data

[63] Continuation of application No. 08/534,207, Sep. 26, 1995, abandoned.

[30] Foreign Application Priority Data

May 10, 1994 [JP] Japan ..................... 6-278236

[51] Int. Cl.⁷ .............. D01C 5/00; C01B 31/00
[52] U.S. Cl. ........................ 264/29.2; 264/29.4
[58] Field of Search ................. 264/29.2, 29.4

[56] References Cited

U.S. PATENT DOCUMENTS

| | | | |
|---|---|---|---|
| 4,699,896 | 10/1987 | Sing et al. | 502/423 |
| 4,933,125 | 6/1990 | Reiniger | 264/29.4 |
| 4,987,664 | 1/1991 | McCullough, Jr. et al. | 28/103 |
| 5,292,460 | 3/1994 | Kyutoku et al. | 264/29.5 |

*Primary Examiner*—Christopher A. Fiorilla
*Attorney, Agent, or Firm*—Shlesinger Arwright & Garvey, LLP

[57] ABSTRACT

Cellulosic single fibers such as cotton are prepared without any resins or pitches to a mass or bulk such as a lap which is self-shaped and retains its form by a force of cohesive intertanglement of fibers. The mass as prepared is heated for carbonization or graphitization, if desired, to obtain unique shaped carbides of porous and stable structures in which the cohesion of fibers is made more dense on account of the total shrinkage of the mass by carbonization.

6 Claims, No Drawings

METHOD FOR MAKING SHAPED CARBIDES OF COHESIVELY INTERTANGLED SINGLE FIBERS

This application is a continuation of application Ser. No. 08/534,207, filed Sep. 26, 1995 now abandoned, which is incorporated herein by reference.

BACKGROUND OF THE INVENTION

This invention relates to a method for making shaped or figured carbides which are consisted of a self-figurable flock, mass, or bulk of single fibers. More specifically, it relates to a method for making shaped or bulked carbides, in which a flock of cellulosic single fibers which has been prepared by binding the fibers by means of their intertwining properties, is heated for carbonization, whereby it can have a strong tissue afforded with high carbonic characteristics and can present porously shaped fibrous structures.

Heretofore, carbonaceous or carbon substances which are prepared from organic matters (hereinafter called generally as carbides) are employed in various industrial applications in accordance with characteristics they have, viz., adsorption, electrical, adiabatic, thermal resistant, corrosion resistant, mechanical, and other characteristics. In either of such applications, carbides have to be shaped to a form appropriate to a purpose of applications. There are known, for example, powdery, granular, and crashed carbides. And, fibrous carbides which are popularly called as carbon fibers, are available in long or lint fibrous, short or fuzz fibrous, woven, sheet or mat-like, and braided forms. In order to improve their mechanical characteristics, they are often prepared to composite materials by mixing and treating them with other materials such as resins and pitches.

In any case, in order to shape them to a form appropriate to a purpose of applications, they must be subjected to a secondary treatment process in addition to preceding carbonization process. More particularly, in case of obtaining powdery carbides, carbides have to be pulverized and sieved after carbonization, and in case of utilizing long fibrous carbides as flakes, they have to be subjected to a chopping process. And, in case of utilizing long fibrous carbides as woven or braided forms, they have to be subjected, after carbonization, to a weaving or braiding process. In such secondary processes, there are much difficulties to prepare them to a desired form. That is, as carbon fibers have inherently a poor elongation and lack in a bending force, they can tolerate to be woven only into comparatively flat stuff having little bending but not into thick and porous structures.

When short fibrous carbides which have been obtained by chopping as mentioned above, are shaped into sheets or mats by a paper-making process in which an adhesive binder is added as an auxiliary agent to the carbides so that they can be integrally shaped, they can produce only those which are flat and thin. There is observed another disadvantage that such auxiliary agent tends to adversely affect characteristics carbides properly have.

As described above, secondary processing to be adopted for shaping carbides into forms appropriate to their applications, are complex, and in certain cases, it adversely affects characteristics the carbides have and increases a production cost fruitlessly.

BRIEF SUMMARY OF THE INVENTION

Accordingly, this invention is to provide a method for making carbides which are self-shaped to have stable porous fibrous structures suitable for fully demonstrating the characteristics the carbides have and accordingly suitable to various applications, whereby such carbides are made by a simple method, at a low production cost, and without problems involved in the conventional production and employment of carbides.

More particularly, in the method for making shaped carbides of intertangled single fibers in accordance with this invention, it is characterized that porous structured raw materials which are made from a figurable intertangled mass of cellulosic single fibers, are heated, as they are shaped, in an non-oxidation atmosphere for carbonization so that entanglement among the single fibers are stiffened on account of shrinkages of the raw materials when they are subjected to the carbonization, exhibiting stable porously shaped fibrous structures. It is accordingly preferable that in respect of structural features, the cellulosic single fibers employed in this invention are those twisted, threaded, waved, curled, or frizzled, that in respect of functional features, they can get entangled easily, and that in respect of physical features, their outer surface areas are remarkably large. It is also preferable in this invention that fibrous raw materials which are made from a mass of entangled single fibers as mentioned above, are selected from a group consisted of those loose fibers, laps, slivers, and rovings which are light in weight and have porous structures.

DETAILED DESCRIPTION OF THE INVENTION

This invention is described below more in detail.

It is the first features of this invention that since the raw materials are consisted of cellulosic single fibers which are slender, have extremely large outer surface areas, and can easily get entangled each other, they can readily be shaped to a desired form of soft and porous mass of single fibers without employment of any binding agent. When such figurable raw materials are heated for carbonization as they are self-shaped, it is noticed that while the single fibers which constitute a mass of the raw materials, are converted to carbides with the progress of carbonizing reactions, they are shrinked as a whole at a constant decrement rate, keeping, continuously till the end of heat treatment, the form to which they have been shaped. This phenomena support working principles of this invention that single fibers can produce a carbonized light and porous mass, and its structures become stronger by carbonization.

While it is known that a mass of raw materials generally loses its tenacity and tends to get hardened when carbonized, an apparent hardness of the mass changes little in this invention, because only slender single fibers of a low denier constitute the mass in this invention. This is comparable to the fact that when a sheet of hard glass is converted to glass fibers, they exhibit softness.

For example, compared to those materials which are conventionally used for carbonization, such as coconut husks and sawdusts which are often employed for the manufacture of an activated carbon, single fibers employed as raw materials in this invention are extremely slender. More in concrete, a fiber width of those cellulosic single fibers which are employable in this invention, is as narrow as 0.01–0.08 mm, and their surface areas are several hundred times of those of the above-mentioned two kinds of raw materials.

Accordingly, it is the second features of this invention that carbides of a mass consisted of single fibers are extremely highly reactive, and consequently that certainly in the carbonization process and also in a process for reactivating the carbides which is conducted in case of need, their reaction speed is high and reaction proceeds evenly throughout the mass. This is one of the advantages attained by this invention.

The raw materials and carbonization treatment employed in this invention, and physical, electrical, and other properties of the carbides obtained by this invention are explained below further in detail.

The principal component of single fibers employed in this invention as raw materials, is cellulose, and their fiber width is preferably about 0.01–0.08 mm. They may be natural fibers as well as those synthetic fibers which are consisted of regenerated cellulose, such as fibers of cotton, flax, hemp, jute, ramie, paper mulberry, *Edgeworthia chrysantha*, bamboo sugarcane, rayon, and others.

In case of cotton fibers, for example, it is not necessary to improve their intertwining properties because they are well provided with natural twists which are spirally turned, while it is preferable to treat fibers preliminarily to carbonization, so that they will be given synthetically with waves or curls, if they are not provided with natural twists and so on. For example, such waves or curls may be given to fibers by passing them between a pair of mold rollers which are heated and face each other for pressing the fibers therebetween.

Those single fibers which are provided with intertwining features or cohesive property, are prepared to a shaped porous mass by machines conventionally utilized in spinning processes. That is, in order to obtain loose fibers, fibrous raw materials are put into a boll breaker, whereby those in a compact group are opened. When they are subjected to a cotton gin, laps are obtained. Slivers are obtainable when the laps are further treated by a carding machine. Rovings are obtained by treating slivers with a flyer frame, while giving them mild twists.

Baking carbonization of those fibrous materials is made generally by heating them to more than 300° C. in a non-oxidation atmosphere for about 6 hours, although such heating conditions may be adjusted properly in view of properties to be afforded to the materials when carbonized. As a carbonization degree and change in shape of the materials vary in accordance with the heating conditions, they shall be adjusted to fit the purpose.

General, physical, and electrical properties of those shaped carbides which are obtainable in this invention, are as follows.

Although carbides have been used for a long time as functional components or parts in various fields, and their applications in today's modern technologies are remarkable, those which are used today remain as they were, and they are mostly powdery, granular, or crushed, except carbon fibers which have been recently developed and employed limitedly in certain industrial fields.

In order to meet them to their applications, it is necessary as described above to process them to compounds by adding other elements to them. This enlarges their application fields, while it induces disadvantageous aspects too, such as complex manufacturing steps and admixture of foreign objects.

Characteristic physical properties of the shaped carbides made in accordance with this invention are enumerated in the following.

When they are macroscopically observed, they are soft, light in weight, and porous, and their bulk density is about 0.02–0.025 $g/cm^2$. Their softness is comparable to that of their raw materials (mass of single fibers which have not been carbonized). As they are supple for one of carbides, it is far easier than in the case of carbon fiber compounds to match them with desired applications. The weight of them which can transform quite freely, is reduced to about 33–45% of their original weight before carbonization. While their porosity is reduced also by about 20–30% of the raw material, their air and liquid permeability is as low as about $\frac{1}{5}$–$\frac{1}{15}$ of conventional powdery and gramlar carbides and carbon fiber webs.

When they are microscopically observed, it is noticed that a fiber width of carbonized single fibers is reduced by about 30–40% of that of raw materials, and they become more slender. As their adsorption properties are accordingly improved because that their surface area per an unit weight increases, the adsorption speed and saturated amount of adsorption are remarkably large, compared to those of conventional carbides.

Electrical properties of the shaped carbides made in accordance with this invention are explained below. Electrical properties of carbides are basically dependent upon superiority or inferiority of electrical conductivities they have. Particularly in the shaped carbides of this invention, as their conductive paths are formed by direct contacts among their carbonaceous substances, electrical properties are largely influenced in proportion to their densities. Since the shaped carbides of this invention is high in density, and their cohesion and contact densities are large, they exhibit extremely good efficiencies when they are applied for the prevention of electric charge, shielding of electromagnetic waves, and surface heat generation, and as various electrodes, electrical double condensers, and so on.

It shall be noted also that their thermal resistant property is excellent on account of the porosity they have, and that their lightness in weight is advantageous in designing machinery incorporating them. As they are porous as well as soft, they can get readily fit machinery or housings when they are used as shielding or packing materials. For example, the carbides of this invention are employable for the adsorption or filtration of air or gas, simply by packing them into a tubular housing or by mounting them over the housing. Such features that they can be conversed freely to various forms, are unprecedented and extremely advantageous in their applications.

Examples of this invention are given below.

EXAMPLE 1

As a starting material, there were employed cotton fibers which were produced in United Sates, and had a fiber width of 0.02–0.05mm, length of 15.0–50.0 mm, and number of natural twists of 140–240 turns/2.5 cm. The fibers were treated by a boll breaker and a cotton gin for obtaining a lap. This lap was cut to have a width of 14 cm, and wound up loosely around a tubular iron core.

This lap loaded about the core was mounted in a carbonization furnace with a non-oxidation atmosphere. The temperature within the furnace contained with the lap was gradually raised until it reached 600° C. At said temperature, the lap was heated further for 3 hours for a carbonization baking treatment.

The carbides thus obtained had a shape in proportion to the one the original cotton lap had, while their tissues become more dense, and dimensions were reduced 29% in width and 35% in thickness compared to the original cotton lap. Their weight was reduced 63%, and bulk density was 0.023.

Tensile strength of the shaped carbides thus made, was measured as shown in the following Table 1.

TABLE 1

|  |  | Original lap of 3.87 cm in width (Note-1) | Carbonized lap of 3.00 cm in width |
| --- | --- | --- | --- |
| Apparent tensile strength (g') (Note-2) | Laterally | 33.0 | 48.6 |
|  | Vertically | 95.6 | 85.6 |

Note-1.
The width of 3.87 cm of the original cotton lap became 3.00 mm, being shrunken by carbonization.
Note-2.
Numerical values of the tensile strength shown in the Table are not those when they were actually cut off, but g' values when fibrous layers were released from their cohesive intertanglement, and presented broken appearances, being dangled.

From the results shown in the above Table 1, it is observed that although the actual tensile strength of the lap carbides should had been lowered, their apparent tensile strength did not differ much from that of the original lap on account of the cohesive intertanglement of fibers, and it is presumed that the lateral strength was rather increased on account of that the intertanglement was densed and reinforced by carborization.

The original lap and the corresponding lap carbides obtained in this Example 1 were immersed and boiled in water for determining their physical stability. The results are given in the following Table 2.

TABLE 2

Test of stability (immersed in 100° C. water for 30 minutes)

|  | Original lap | | Carbonized lap | |
| --- | --- | --- | --- | --- |
|  | before immersion | after immersion test | before immersion | after immersion test |
| Lateral dimension (cm) | 10.0 | 12.0–13.0 | 10.0 | 9.0–10.0 |
| Vertical dimension (cm) | 5.0 | 6.0–7.5 | 5.0 | 4.8 |

From the result shown in the above Table 2, it is observed that the dimensions of the original row lap varied much both laterally and vertically, particularly largely in its vertical direction because that a cohesive intertwining force among the fibers in the vertical direction was comparatively weak, while the lap carbides were not deformed much and their surface tissues were uniform and smooth even after the immersion test was conducted.

EXAMPLE 2

Cotton same to the one used in Example 1 as a raw material, was evenly opened by a boll breaker to obtain a loose fiber (this invention sample $\underline{A}$).

Viscose rayon filaments of 1.5 denier which had been processed to be waved by the employment of a pair of pressing mold rollers heated to 400° C. at their surfaces, were cut to 2.5 cm and thoroughly opened to obtain a sample (this invention sample $\underline{B}$).

As comparative samples, there were prepared a No. 8 cotton canvas (comparison sample $\underline{C}$), a cotton rope of 4 mm in diameter (comparison sample $\underline{D}$), and a braid of 2.5 mm in diameter made from the above-mentioned viscose rayon filaments (comparison sample $\underline{E}$).

They were mounted in a carbonization furnace, and a temperature of the furnace was raised gradually while the air was shut out from the furnace, until it reached 840° C. in 2.5 hours. At 840° C., they are further heated for 3.5 hours to complete their carbonization.

This invention samples $\underline{A}$ and $\underline{B}$ thus heat-treated were carbonized loose fibers in which the fibers were densely intertangled each other to present porous structure.

After all of the samples thus treated (this invention samples $\underline{A}$ and $\underline{B}$, and comparison samples $\underline{C}$, $\underline{D}$, and $\underline{E}$) were kept in the furnace at 800° C. and subjected to a steam activation treatment for 40 minutes, they were cooled in the furnace to a room temperature and then taken out from the furnace.

In order to compare their reactivities, Methylene Blue adsorption test was made to obtain the results shown in the following Table 3.

TABLE 3

|  | Adsorption Properties | |
| --- | --- | --- |
|  | Adsorption speed (Note-3) | Adsorption saturation amount (Note-4) |
| This invention sample $\underline{A}$ | 4 | 0.045 |
| This invention sample $\underline{B}$ | 4–5 | 0.050 |
| Comparison sample $\underline{C}$ | 110 | — |
| Comparison sample $\underline{D}$ | 98 | — |
| Cornparison sample $\underline{E}$ | 370 | — |

Note-3
Time (minutes) required for the sample carbides of 1 g' (absolutely dried) to completely adsorb 0.001 g of Methylene Blue.
Note-4
Maximum amount (g') the sample carbides of 1 g (absolutely dried) had adsorbed.

As the results in the Table 3 indicate, adsorption efficiencies of carbides do not depend on materials of which they are composed, but depend on structures or tissues they have. The self-shaped carbides made in accordance with this invention have accordingly a high surface reactivity which can not be expected to conventional carbides.

As described above, by the method of this invention, those shaped carbides, processing and reactivity of which are easy and excellent, which are light in weight and have soft porous fiber structures appropriate to various applications, and which have also stable tissues suited to present high carbon characteristics, can be manufactured by an extremely simple manner and at a low production cost.

While the single fibers were heat-treated to carbonization in the above examples, they may be heated to graphitization. This is also within the scope of this invention.

We claim:
1. A method for making a shaped carbonaceous material comprising the steps of:
   a) forming a plurality of binder-free, single fibers into a shaped self-supporting mass of single fibers, wherein:
      said single fibers primarily consist of cellulose fibers, each configuration of which is non-linear so as to be entangled with one another,
      said shaped self-supporting mass of single fibers is prepared as loose fibers, laps, slivers, or rovings, and
      said shaped self-supporting mass of single fibers is not needle-punched; and b) sufficiently heating said shaped self-supporting mass of single fibers, which is binder-free and not needle-punched, to cause at least one of carbonization or graphitization of said single fibers, whereby:

said single fibers are thoroughly entangled with one another and said shaped self-supporting mass is made excellently stable; and said shaped carbonaceous material has a bulk density of 0.025 g/cm$^3$ or less and is soft, light and porous.

2. The method according to claim 1, in which said bulk density is 0.02 g/cm$^3$ or more.

3. The method according to claim 1, in which each configuration of said cellulosic single fibers is non-linear due to at least one of twisted, waved and curled shapes.

4. The method according to claim 1, in which said cellulosic single fibers are each within the range of 0.01–0.08 mm in width.

5. The method according to claim 1, wherein in Step b of sufficiently heating said shaped self-supporting mass of single fibers, said mass is heated for more than 3 hours at a temperature of higher than 300° C.

6. The method according to claim 1, wherein in Step b of sufficiently heating said shaped self-supporting mass of single fibers, said mass reduces its weight by 33–45%, its porosity by 20–30%, and the width of fiber thereof by 30–40%.

* * * * *